March 18, 1930.　　　C. B. WOODWORTH　　　1,750,915
SPRING COVER
Filed Oct. 6, 1924　　　2 Sheets-Sheet 1
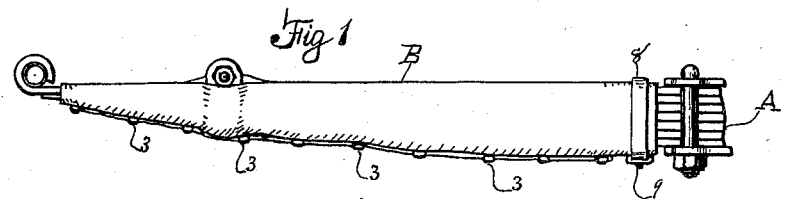
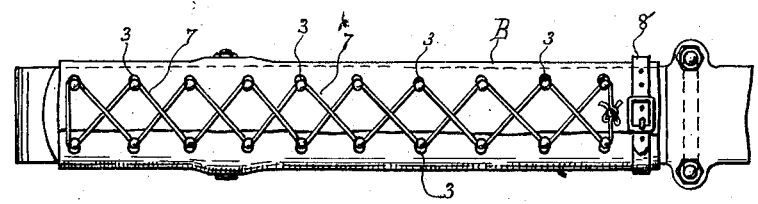
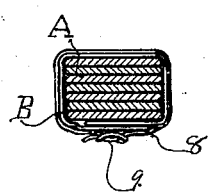 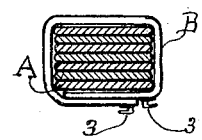 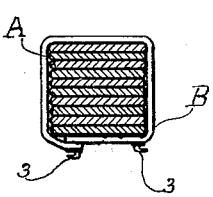
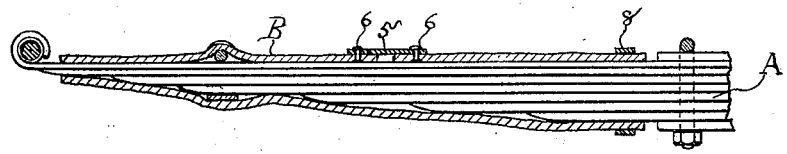
INVENTOR.
Charles B. Woodworth
BY F. N. Gilbert
ATTORNEYS.

March 18, 1930.  C. B. WOODWORTH  1,750,915
SPRING COVER
Filed Oct. 6, 1924　　2 Sheets-Sheet 2
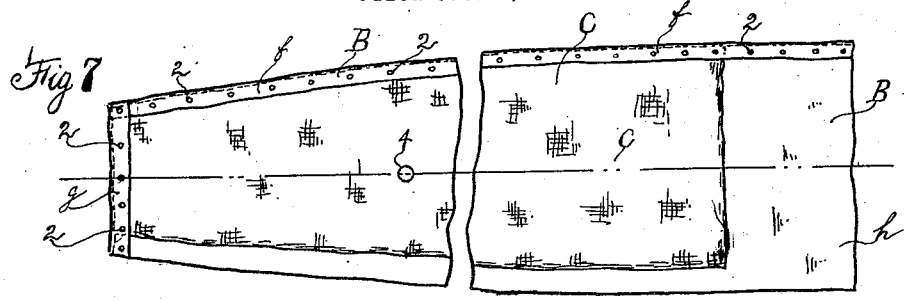
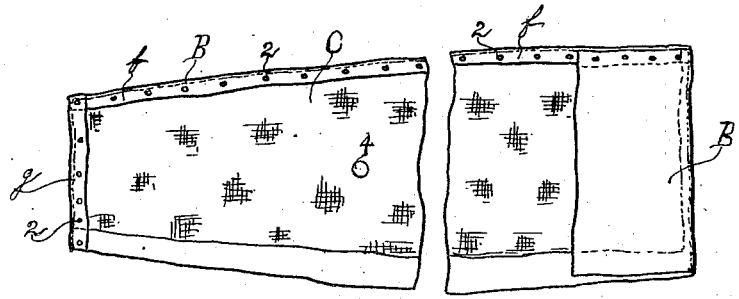
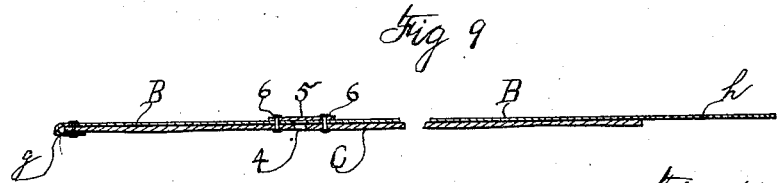
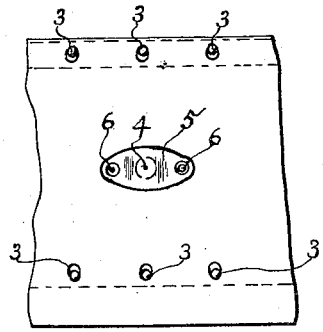
INVENTOR.
Charles B. Woodworth
BY
ATTORNEYS.

Patented Mar. 18, 1930

1,750,915

UNITED STATES PATENT OFFICE

CHARLES B. WOODWORTH, OF BINGHAMTON, NEW YORK

SPRING COVER

Application filed October 6, 1924. Serial No. 741,803.

My invention relates to spring covers of the kind used in automobiles or other vehicles, to cover the springs and keep the same lubricated and to form a cover adjustable as to width and length by lacing and folding. I have heretofore obtained Patent No. 1,380,858, of June 7, 1921.

The object of my invention is to provide a spring cover which is so made that it will permit the edges being laced near together or farther apart and with the edges overlapping, so as to make them fit springs still larger and also bind the ends of the cover and hold them in firm engagement or contact with the springs.

Other objects of my invention are to provide a cover or casing for springs which can be adjusted as to length by folding over or turning in the ends and also to provide a casing which will be a simple and effective means for spring lubrication.

With these objects in view, my invention consists in certain novel features of construction and arrangement of parts as will be hereinafter more particularly described and pointed out in the claims, references being had to the accompanying drawings, in which Fig. 1 is a side elevation of my device mounted on a spring;

Fig. 2 is a plan view of my device mounted on a spring;

Figs. 3, 4, and 5 are detail transverse sectional views with my device mounted on springs of different size;

Fig. 6 is a side view in cross section of my device as mounted on a spring;

Fig. 7 is a bottom plan view of my device;

Fig. 8 is a bottom plan view of my device with one end folded over;

Fig. 9 is a sectional view on line 9—9 of Fig. 7 of my device;

Fig. 10 is a fragmentary top plan view of my device.

The same reference characters denote like parts in each of the several figures of the drawings.

In carrying out my invention I have the springs A and a cover body consisting of an outer casing or covering member B of impervious material, such as oil cloth or any well known water proof material, and an inner pad or lining C of felt or other absorbent material. One edge of the covering member B is turned over on the pad or inner lining C, as shown at f; also the end is turned over on the pad or inner lining, as shown at g. These outer turned over edges f and g are fastened by the rivets 2, 2, 2 formations projecting from the base of the lacing hooks 3, 3, 3. One end h of the cover is wider than the other, the wider end of the cover body B extending beyond the felt lining C forming an inturned flap h for turning over on the lining C, providing a means for adjusting the length of the casing B, to any proper length required by different springs, as shown in Fig. 8.

To aid in the lubrication of the springs I have in my device, thorugh the center of the outer cover body B and of the lining or felt C, an opening 4, and on the outer surface of B and over the opening 4, I have mounted a plate 5 which is fastened by the rivets at either end 6, 6. The extension of the cover forming a flap h, being of one thickness of material, makes it easy for turning or folding over on the lining or felt C, as shown in Fig. 8. The one edge and one end of the outer cover member B may be turned over on the one edge and end of the lining C as shown in Figs. 7, 8, and 9, so that when the cover is in place no parts of the felt pad will be visible or exposed. The turned over edges of B are fastened on one side of the felt and on one end thereof by the shanks or rivet ends 2, 2, 2 of the lacing hooks 3, 3, 3.

In mounting my cover body on the springs A, I turn over the flap h on the lining C, until the fold h brings the length of the cover B to the requisite length of the springs A as shown in Figs. 8, 9 and 10. The cover B with the flap h thus folded to the required length is then wrapped around the spring body A, as shown in Figs. 1, 2, and 6. The edge of one side of the cover B overlaps the edge of the opposite side of the cover B as shown in Figs. 4 and 5, the extent of the lap being according to the size of the spring A. Between the lacing hooks 3, 3, 3 I mount the connecting laces 7, 7, 7, and thus draw the edges of the cover, overlapping as described, close together and hold them firmly there and securely in that position, as shown in Figs. 1 and 2. The form of the attachment of the lacing cord 7, 7, 7 and ties may be modified to suit the pleasure of the user. When thus secured I place around the wider end of the wrapped cover B the strap 8, having the usual buckle 9, for drawing the cover end firmly around the springs, and the edges firmly together or towards each other.

For the purpose of supplying lubricating oil to the springs A I have the opening 4 through the outer cover B and inner lining C. Over the mouth of opening 4 and on the surface of the outer cover I have the cover plate 5 attached to the outer cover by means of a rivet 6 at each end thereof. By reason of the yielding cover surfaces, the plate permits of the insertion of a spout of an oil can between the outer surface of cover B and under side of plate 5 and into the opening 4, and thus supply oil to the springs A and spring leaves A.

In this simple manner means of lubrication are amply supplied without having to resort to tubes or metal conduits expensive to mount and maintain. The spring cover shown keeps the springs well lubricated so that the springs at all times will yield freely and will not stiffen up, due to the rusting of the leaves or to excessive friction of the leaves caused by the introduction of grit or other foreign matter between the leaves.

The spring covers present a neat appearance in place on the springs and hide the projecting parts. The fastening devices described are particularly desirable because, being so adjustable, they permit the overlapping of the edges of the cover to any desired extent, and permit one size of cover to be used on springs of a number of different sizes.

The lacing feature enables this cover to be adjustable as to width and length, and to fit over the springs of a variety of cars having springs of different sizes. The location of the lace hooks and lacings applied thereto permit of the overlapping edges to be brought nearer together or farther apart and to be easily adjustable to a plurality of springs of varied sizes.

I reserve the right to modify and change the forms and details of construction and arrangement of the parts, without departing from the spirit of my invention.

Having thus described my invention, what I claim as new and for which I desire Letters Patent, is as follows:

1. A spring cover comprising an outer casing of impervious material and a pad made of absorbent material, one longitudinal edge of the casing folding over the contiguous longitudinal edge of the pad and one end of the casing folding over and secured to the corresponding end of the pad, the other longitudinal edge of the pad and the other end of the pad terminating short of the corresponding edge and end of the casing and being unsecured thereto with the end of the casing prolonged beyond the end of the pad and foldable on itself to fit springs of different lengths, securing means extending through the contiguous longitudinal and end folds for securing the outer casing and pad together, said securing means along the longitudinal edge terminating in lacing hooks, a cooperating row of lacing hooks mounted on the other longitudinal side of the outer casing and spaced from the edge thereof and lacing means engaging the rows of hooks for drawing the opposing edges of the cover together in overlapping position.

2. A spring cover comprising an outer casing of impervious material and a pad made of absorbent material, the pad and casing being secured to each other with one end edge free, the free end edge of the cover extending beyond the free end edge of the pad and foldable upon itself to adapt the spring cover for use with springs of different lengths and fastening means on the cover to secure the cover in operative position.

In testimony whereof I have affixed my signature.

CHARLES B. WOODWORTH.